United States Patent [19]
Gehrke et al.

[11] Patent Number: 5,735,747
[45] Date of Patent: Apr. 7, 1998

[54] SLIP YOKE SEALING DEVICE

[75] Inventors: Glenn Gehrke, Davisburg; Kevin Baldwin, Rochester Hills, both of Mich.

[73] Assignee: Meritor Heavy Vehicle Systems, LLC

[21] Appl. No.: 630,700

[22] Filed: Apr. 12, 1996

[51] Int. Cl.⁶ ........................................ F16D 3/20
[52] U.S. Cl. ................... 464/133; 464/162; 277/212 R
[58] Field of Search .................... 277/212 C, 212 R, 277/188 R; 403/359, 53, 50; 464/133, 157, 158, 179, 183, 905, 162; 74/492

[56] References Cited

U.S. PATENT DOCUMENTS

| | | |
|---|---|---|
| 1,304,901 | 5/1919 | Peters . |
| 1,541,007 | 6/1925 | Thiemer . |
| 1,621,219 | 3/1927 | Peters . |
| 1,917,988 | 7/1933 | Large . |
| 2,008,830 | 7/1935 | Johnson .................. 464/133 X |
| 2,116,290 | 5/1938 | Spicer . |
| 2,510,362 | 6/1950 | Anderson . |
| 2,839,902 | 6/1958 | Glover . |
| 3,063,266 | 11/1962 | Rabson . |
| 3,123,990 | 3/1964 | Freeman . |
| 3,344,618 | 10/1967 | Young . |
| 3,367,142 | 2/1968 | Groves et al. . |
| 3,400,558 | 9/1968 | Haines . |
| 3,508,418 | 4/1970 | Jones . |
| 3,650,123 | 3/1972 | Sheppard, Jr. . |
| 3,989,259 | 11/1976 | Lorenz et al. . |
| 4,114,898 | 9/1978 | Bainard et al. . |
| 4,319,467 | 3/1982 | Hegler et al. . |
| 4,475,737 | 10/1984 | Cook, Jr. et al. . |
| 4,573,946 | 3/1986 | Brissette .................. 464/133 |
| 4,580,996 | 4/1986 | Brissette .................. 464/133 |
| 4,666,166 | 5/1987 | Hart et al. ................ 403/50 X |
| 5,078,533 | 1/1992 | Madonio et al. ........... 403/288 |
| 5,451,186 | 9/1995 | Poulin et al. ............. 464/905 X |

FOREIGN PATENT DOCUMENTS 285428   1/1971   U.S.S.R. ........................ 277/212 R

*Primary Examiner*—Daniel P. Stodola
*Assistant Examiner*—Gregory J. Strimbu

[57] ABSTRACT

A sealing device for a driveline slip yoke includes a flexible diaphragm and a generally rigid cap that cooperate to provide a fluid-tight seal across one end of the slip yoke. The diaphragm and the cap have outer peripheral edges that are preferably received within a groove on the slip yoke such that the cap maintains the diaphragm in proper sealing engagement with the slip yoke. The flexible diaphragm flexes and extends inwardly and outwardly of the slip yoke in response to varying pressures within the slip yoke caused by the relative axial movement of a splined shaft within the yoke. The cap not only maintains the diaphragm in proper sealing engagement with the slip yoke, but also limits the outward flexing of the diaphragm responsive to the pressure within the slip yoke. A slip yoke sealing device designed according to this invention is especially useful in applications that require that lubricant be maintained within the slip yoke over extensive periods during extensive use.

19 Claims, 1 Drawing Sheet

SLIP YOKE SEALING DEVICE

BACKGROUND OF THE INVENTION

This invention relates generally to a plug for closing the end of a driveline slip yoke and, more specifically, to a sealing device for closing the end of a slip yoke to maintain a lubricant within the slip yoke and to prevent contaminants from entering the slip yoke.

Drivetrains for use in heavy-duty applications often include a slip yoke connection for connecting a splined shaft to a universal joint. A conventional slip yoke includes a central, longitudinal bore that receives a splined portion on a connection shaft. The splined shaft typically moves axially within the slip yoke bore. Lubricant is provided within the slip yoke bore to facilitate the relative axial movement between the splined shaft and the slip yoke. Each end of the slip yoke bore should be sealed to maintain the lubricant within the bore and to prevent undesirable contaminants from entering the bore.

Conventional slip yoke plugs have been staked or welded into the bore of a slip yoke. Such connections include the drawback of being labor-intensive and, at times, have weakened the slip yoke structure. Moreover, it has proven difficult to control the assembly of conventional plugs to ensure proper placement within the slip yoke.

Another type of known system includes a single-piece, generally rigid plug. Such plugs are not fully satisfactory for all applications, however. The axial movement between the splined shaft and the slip yoke creates large pressure fluctuations within the slip yoke bore. Accordingly, typical slip yoke plugs must be made substantially rigid in order to withstand the pressure that is built up within the central bore of the slip yoke. If a plug is not sufficiently rigid, it may be forced out of connection with the slip yoke during a typical application. Rigid plugs, however, suffer from the drawback of not being able to provide a sufficiently fluid-tight seal at the end of the slip yoke. Accordingly, in conventional systems, lubricant is sometimes allowed to leak from or be expelled from the slip yoke.

More recently the assignee of this application has developed slip yoke designed to perform over extensive periods (i.e., several hundred thousand miles of operation) without requiring any maintenance. Therefore, such systems require that all lubrication in the system be maintained within the slip yoke while keeping all contaminants out of the system. Accordingly, sufficient fluid-tight sealing is required at each end of the slip yoke bore.

This invention provides a slip yoke sealing device that meets the needs of modern driveline systems that overcomes the shortcomings and drawbacks of the conventional slip yoke plugs discussed above.

SUMMARY OF THE INVENTION

In general terms, this invention is a drive transmission that includes a slip yoke having a central bore extending axially between a first end and a second end of the yoke. A shaft is slidably received within the central bore for axial movement relative to the slip yoke bore. A resilient diaphragm extends across and seals the first end of the slip yoke. A substantially rigid cover encloses the diaphragm and the first end of the slip yoke bore such that a fluid-tight seal is maintained that prevents lubricant from leaking out of the system and prevents undesirable contaminants from entering the system.

In a preferred embodiment, the slip yoke includes a groove near the first end of the central bore. The groove receives an outer periphery on the diaphragm and an outer peripheral edge on the cover. The outer edge of the cover is nestingly received within the groove such that it keeps the outer periphery of the diaphragm in fluid-tight sealing engagement within a portion of the groove to seal off the first end of the yoke.

These and other features and advantages of this invention will become apparent to skilled artisans from the following detailed description of the presently preferred embodiment. The drawings that accompany the detailed description can be described as follows.

DETAILED DESCRIPTION OF THE PREFERRED EMBODIMENT

Figure 1:
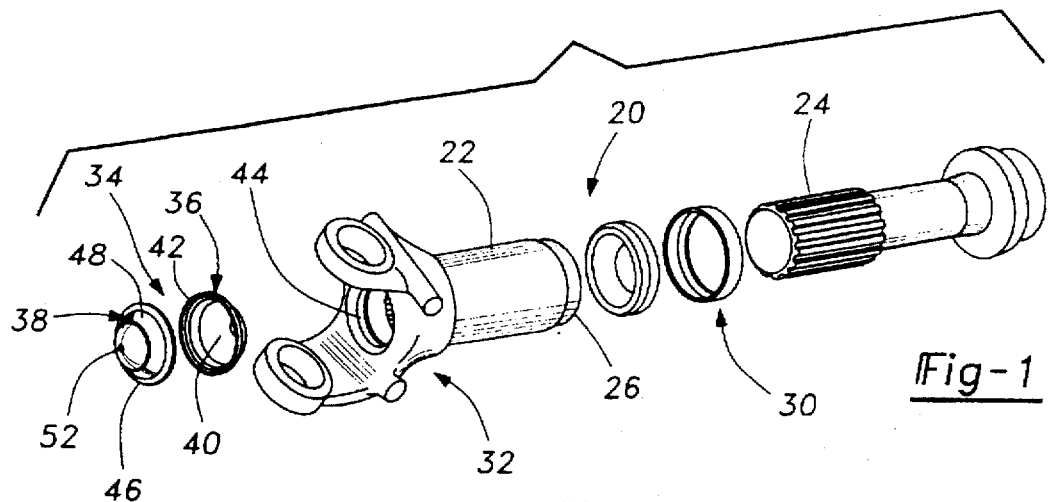
FIG. 1 is an exploded, perspective view of selected portions of a drive transmission designed according to this invention.
Figure 2:
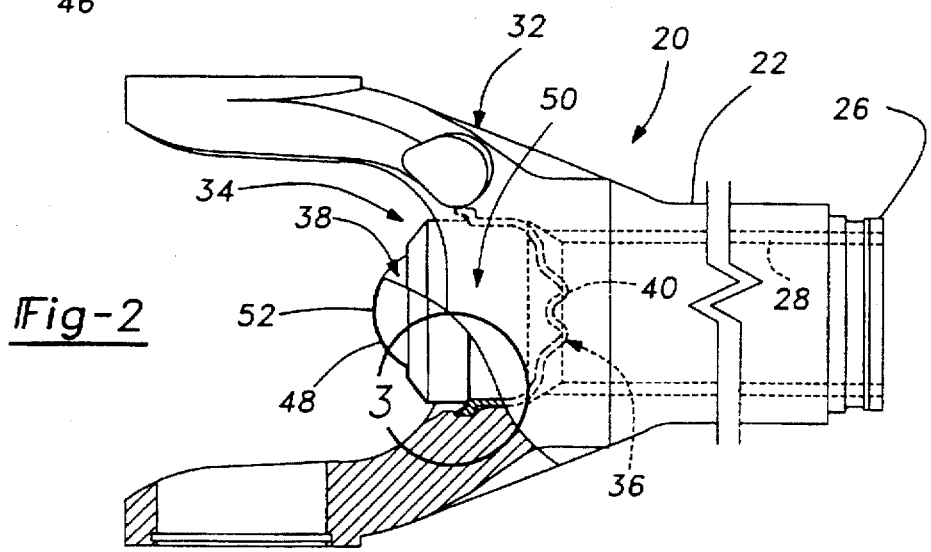
FIG. 2 is a side elevational view of selected portions of the embodiment of FIG. 1.

FIGS. 1 and 2 illustrate a drive transmission 20 that includes a slip yoke 22 and a splined shaft 24. The shaft 24 is received through one end 26 of the slip yoke 22 into a central bore 28 (shown in FIG. 2), which extends axially through the slip yoke 22. The shaft 24 is slidably received within the bore 28 such that the shaft 24 can move axially relative to the slip yoke 22. Accordingly, lubricant is preferably placed within the bore 28 to facilitate the relative axial movement between the shaft 24 and the yoke 22.

A conventional seal arrangement 30 is provided at the end 26 of the slip yoke 22 and a sealing device 34 is provided at the other end 32. The sealing device 34 maintains lubricant within the bore 28 while also keeping undesirable contaminants from entering the bore 28.

The sealing device 34 includes a generally resilient, flexible diaphragm 36 and a relatively rigid cap or cover 38. The diaphragm 36 includes a central portion 40 and an outer periphery 42. The diaphragm 36 cooperates with the cap 38 to provide a fluid-tight seal across the opening of the bore 28 at the end 32 of the slip yoke 22. The outer periphery 42 is preferably received within a groove 44 that is formed in the slip yoke 22 adjacent the end of the bore 28.

The cap 38 preferably includes an outer peripheral edge 46 and a central portion 48. The outer peripheral edge 46 is also received within the groove 44 as will be described in more detail below. As illustrated, the central portion 48 of the cap 38 is preferably bowed generally outward and away from the central bore 28. In other words, the central portion 48 of the cap 38 is preferably convex when viewed from outside of the slip yoke 22.

Spacing 50 is provided between the interior of the cap 38 and the opposing face of the diaphragm 36. As the shaft 24 moves axially relative to the slip yoke 22, large pressures are built up within the central bore 28. The central portion 40 of the diaphragm 36 flexes and extends responsive to such pressure. For example, when the shaft 24 moves to the left (according to the drawings), the volume between the leading end of the shaft 24 and the end 32 of the slip yoke is decreased. Accordingly, the amount of pressure within that portion of the bore 28 increases forcing the lubricant toward the end 32 of the slip yoke 22. The central portion 40 of the diaphragm 36 responsively flexes outward, away from the central bore 28.

The cap 38 maintains the outer periphery 42 of the diaphragm 36 in proper sealing engagement with the slip yoke 22 and limits the amount of axial movement and extension of the central portion 40. The cap 38 preferably has an opening 52 in the central portion 48 to allow any air or fluid that is within the spacing 50 to be expelled through the cap opening 52 as the diaphragm flexes toward the cap. Importantly, the diaphragm 36 prevents any fluid within the spacing 50 from communicating with the interior of the central bore 28.

Figure 3:
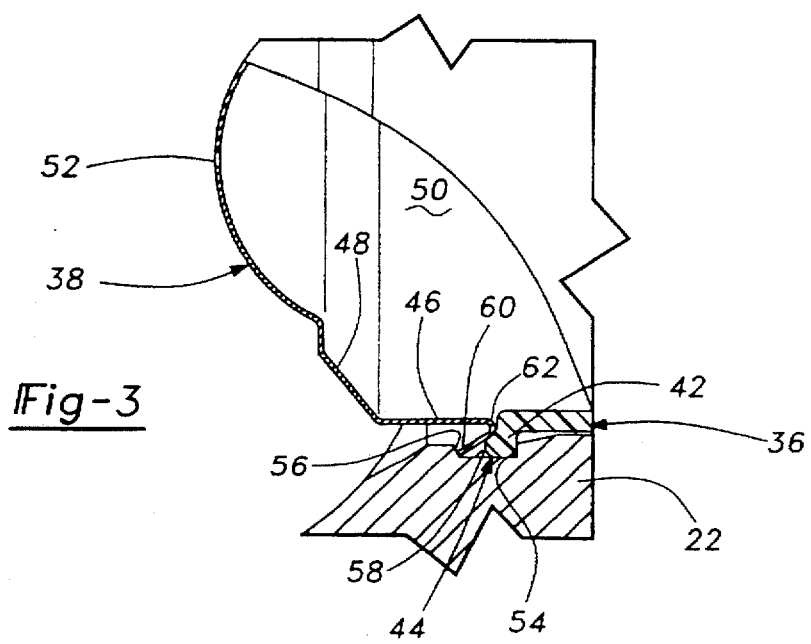
FIG. 3 is a partial, cross-sectional view of selected portions of FIG. 2.

Referring now to FIG. 3, the details of how the diaphragm 36 and cap 38 are received within groove 44 can be seen. Groove 44 preferably includes opposing shoulders 54 and 56. An inner peripheral surface 58 extends longitudinally between the shoulders 54 and 56.

During the preferred assembly procedure, the diaphragm 36 is pressed into engagement with the slip yoke 22 such that the outer periphery 42 on the diaphragm 36 is received within the groove 44. The outer periphery 42 preferably rests against the shoulder 54 and engages the inner peripheral surface 58, as illustrated. Then, the cover 38 is pressed into engagement with the slip yoke 22. The outer peripheral edge 46 preferably is received within the groove 44 such that a terminal end 60 on the outer peripheral edge 46 abuttingly engages the shoulder 56. A rounded edge 62 that extends away from the end 60 bears against at least a portion of the outer periphery 42 of the diaphragm 36. Accordingly, the outer peripheral edge 46 on the cover 38 maintains the outer periphery 42 of the diaphragm 36 in fluid-tight sealing engagement with the shoulder 54 and a portion of the inner peripheral surface 58. This cooperative engagement of the cap 38, the diaphragm 36 and the groove 44 maintain a fluid-tight seal at the end 32 of the yoke 22.

The illustrated peripheral edge 46, including the rounded edge, is well-suited for relatively easy assembly into the slip yoke groove 44. The rounded edge 62 serves as a leading ramp during the assembly process. The portion between the rounded edge 62 and the terminal end 60 preferably is moderately flexible in a radial direction such that it is able to flex inward slightly upon insertion and to "snap" into the illustrated orientation.

The combination of the flexible diaphragm and the substantially rigid cover provides a tight seal and a secure arrangement. The arrangement of the rounded edge 62 against the outer periphery 42 keeps the diaphragm 36 in proper sealing position even when extreme pressures are created within the central bore 28.

The foregoing description is exemplary rather than limiting in nature. Skilled artisans will realize that various modifications to the disclosed embodiment are possible, however, such modifications do not necessarily depart from the purview and spirit of this invention. Accordingly, the appended claims must be studied to determine the proper legal scope of this invention.

What is claimed is:

1. A drive transmission, comprising:

a slip yoke having a longitudinal bore extending through a central portion of said yoke, an annular groove being defined in said yoke near one end of said bore;

a shaft slidably received in said bore for axial movement toward and away from said one end of said bore;

a generally flexible diaphragm having an outer periphery received within said annular groove; and a relatively rigid cap having a circumferential portion received within said groove for keeping said outer periphery of said diaphragm within said groove, said diaphragm being disposed between said cap and said longitudinal bore in said yoke.

2. The drive transmission of claim 1, wherein said cap includes an opening for allowing fluid to pass through said cap and wherein said diaphragm prevents any of said fluid from communicating with said longitudinal bore in said yoke.

3. The drive transmission of claim 1, wherein said groove includes a radial shoulder and said outer periphery of said diaphragm is maintained against said shoulder by said circumferential portion of said cap.

4. The drive transmission of claim 1, wherein said groove includes a first radially extending shoulder and a second radially extending shoulder, said first shoulder being spaced longitudinally inward from said second shoulder.

5. The drive transmission of claim 4, wherein said diaphragm outer periphery sealingly engages said first shoulder.

6. The drive transmission of claim 5, wherein said circumferential portion of said cap biases said diaphragm outer periphery against said first shoulder.

7. The drive transmission of claim 4, wherein said circumferential portion of said cap has an end that abuts said second shoulder and a rounded portion longitudinally spaced from said end, said rounded portion bearing against a portion of said outer periphery of said diaphragm such that said diaphragm is held against said first shoulder.

8. The drive transmission of claim 1, wherein said a central portion that flexes responsive to pressure within said bore caused by axial movement of said shaft within said bore such that said central portion extends inward into said longitudinal bore and outward toward said cap.

9. The drive transmission of claim 8, wherein said cap has a central portion that extends outward and away from said bore and wherein said cap central portion limits a distance that said diaphragm central portion flexes and extends outward from said bore.

10. The drive transmission of claim 9, wherein said cap central portion includes an opening to allow fluid communication through said opening to prevent a pressure from being built up between said diaphragm and said cap.

11. The drive transmission of claim 1, wherein said diaphragm is made of rubber.

12. The drive transmission of claim 1, wherein said cap is made of metal.

13. A drive transmission, comprising:

a slip yoke with a central bore extending axially between a first end and a second end of said yoke;

a shaft slidably received within said central bore for axial movement relative to said yoke;

a resilient diaphragm extending across and sealing said first end of said central bore; and a substantially rigid cover enclosing said diaphragm and said first end of said central bore.

14. The drive transmission of claim 13, wherein said yoke includes an annular groove near said first end of said central bore, said diaphragm has an outer periphery that is received within said groove, and said cover has an outer peripheral edge received in said groove.

15. The drive transmission of claim 14, wherein said annular groove includes first and second radially extending shoulders, said first shoulder being more internal to said yoke than said second shoulder and wherein said cover peripheral edge engages said second shoulder such that said diaphragm outer periphery is sealingly biased into said first shoulder by said cover peripheral edge.

16. The drive transmission of claim 13, wherein said diaphragm has a central portion that flexes inward toward said central bore and outward away from said central bore in response to pressure within said central bore caused by axial movement of said shaft within said bore.

17. The drive transmission of claim 16, wherein said cover has a generally arcuate central portion and wherein a distance that said diaphragm central portion flexes outward and away from said central bore is limited by said cover central portion.

18. The drive transmission of claim 16, wherein said cover includes a central portion having an opening for allowing fluid to pass through said opening as said diaphragm central portion flexes and wherein said diaphragm prevents communication of said fluid with said central bore.

19. The drive transmission of claim 13, wherein
said yoke includes an annular groove, near said first end of said central bore, that has two longitudinally spaced and opposing shoulders,
said diaphragm has an outer periphery that is received within said groove against one of said shoulders and
said cover has a peripheral surface that is nested within said groove such that an edge on said peripheral surface abuttingly engages the other of said shoulders and a rounded portion of said peripheral surface that is longitudinally spaced from said edge of said peripheral surface abuttingly engages at least a portion of said diaphragm outer periphery such that said diaphragm sealingly engages said one of said shoulders.

* * * * *